United States Patent [19]

Ando

[11] Patent Number: 5,732,052
[45] Date of Patent: Mar. 24, 1998

[54] OPTICAL INFORMATION RECORDING AND/OR REPRODUCING APPARATUS CAPABLE OF SELECTING ONE OF FOCUSING ERROR SIGNALS DEPENDING UPON OPERATING MODE

[75] Inventor: Hirotake Ando, Tokyo, Japan

[73] Assignee: Canon Kabushiki Kaisha, Tokyo, Japan

[21] Appl. No.: 539,266

[22] Filed: Oct. 4, 1995

[30] Foreign Application Priority Data

Oct. 5, 1994 [JP] Japan .................. 6-241275

[51] Int. Cl.$^6$ .................................................. G11B 7/09
[52] U.S. Cl. ........................... 369/44.29; 369/44.35; 369/44.27
[58] Field of Search ................... 369/44.35, 44.36, 369/44.29, 44.25, 44.27, 54; 350/201.5

[56] References Cited

U.S. PATENT DOCUMENTS 4,786,794  11/1988  Doi .............................. 369/44.25
4,891,798   1/1990  Shinkai ......................... 369/44.25
5,199,011   3/1993  McDonald et al. ........... 369/44.27 X
5,347,502   9/1994  Yamada et al. ................. 369/44.36
5,477,514  12/1995  Watanabe et al. ............... 369/44.28

Primary Examiner—Thang V. Tran
Attorney, Agent, or Firm—Fitzpatrick, Cella, Harper & Scinto

[57] ABSTRACT

An optical information recording and/or reproducing apparatus is arranged to record and/or reproduce information on or from a recording medium with a light beam. The apparatus includes a circuit for generating a focusing error signal of the light beam, a filter for filtering the focusing error signal, the attenuation factor of the filter being greater at a high frequency region, a circuit for selecting either a focusing error signal filtered by the filter or a focusing error signal not filtered by the filter in accordance with an operating mode of the apparatus, and a circuit for executing focusing control of the light beam, using the selected focusing error signal.

3 Claims, 5 Drawing Sheets

OPTICAL INFORMATION RECORDING AND/OR REPRODUCING APPARATUS CAPABLE OF SELECTING ONE OF FOCUSING ERROR SIGNALS DEPENDING UPON OPERATING MODE

BACKGROUND OF THE INVENTION

1. Field of the Invention

The present invention relates to an optical information recording and/or reproducing apparatus for optically recording and/or reproducing information, and more particularly to a focus controlling apparatus for controlling the focus of a light beam projected to a recording medium.

2. Related Background Art

FIG. 1 is a block diagram to show a servo control apparatus for tracking servo and focusing servo in a conventional optical information recording and/or reproducing apparatus. Here is shown an example of the servo control apparatus for controlling tracking and focusing by digital signal processing. In FIG. 1, first, upon recording or reproducing information an optical head (not shown) projects a light beam toward a recording medium such as an optical disk and a photodetector 1 receives reflected light from the recording medium. The photodetector 1 is a multi-divisional photodetector composed of plural segments, and signals according to the light received by the respective detection segments in the photodetector 1 are sent to an error signal generating circuit 2. Based on the signals according to the light received by the respective detection segments in the photodetector 1, the error signal generating circuit 2 generates a tracking error signal indicating a tracking error of the light beam and a focusing error signal indicating a focusing error. An example of a method for detecting the tracking error signal is the push-pull method, and an example of a method for detecting the focusing error signal is the astigmatic method.

The tracking error signal obtained in the error signal generating circuit 2 is sent through a filter 3 into one of two channels of A/D converter 6 while the focusing error signal is sent through a filter 4 into the other channel of the A/D converter 6. The filters 3, 4 are, for example, primary low-pass filters. Here, the A/D converter 6 receives a clock signal of a constant period from a clock circuit 14. With this clock signal, the A/D converter 6 converts the tracking error signal and focusing error signal into corresponding digital signals. On the other hand, the clock signal is input as an interrupt signal into CPU 7. Receiving the interrupt signal, the CPU 7 suspends current processing to handle servo processing of tracking control and focusing control.

In more detail, the CPU 7, receiving the interrupt, reads out the digital values of tracking error signal and focusing error signal in the A/D converter 6 and handles phase compensation and gain arithmetic of tracking and focusing based on the values. A result of the arithmetic of tracking phase compensation is output through a D/A converter 8 to a driver 10 while a result of the arithmetic of focusing phase compensation is output through a D/A converter 9 to a driver 11. Then the driver 10 sends a drive signal according to the arithmetic result from converter 8 to a tracking actuator 12, while the driver 11 similarly sends a drive signal according to the arithmetic result from converter 9 to a focusing actuator 13. This results in controlling an objective lens (not shown) for focusing the light beam on the medium in the tracking direction and focusing direction to effect feedback so as to locate the light beam emitted from the optical head at the center of a track and so as to maintain the light beam in focus. The above operation completes the servo processing with an interrupt. After that, CPU 7 handles the same servo processing for every interrupt from the clock circuit 14. Thus, the tracking control and focusing control are carried out by handling the servo processing at constant intervals in time (or at constant frequency) in the above manner.

The conventional servo control apparatus as described above, however, had the following problems. Let us consider a case in which a component of the tracking error signal is mixed with the focusing error signal because of an aberration of the optical components or due to errors in optical adjustment. In that case, the tracking error signal component, which is not the original focusing error signal, in the focusing error signal is sampled at the constant frequency. Thus, there was a problem that it could disturb the focusing servo operation, depending upon the magnitude or frequency of the tracking error signal component that is mixed with the focusing error signal. Particularly, there was a problem that such disturbance became great when the tracking servo was off; among the rest, during the seek operation of the optical head. When, the tracking servo is on, the level of the tracking error signal is very low, and thus, the component of the tracking error signal that might mix with the focusing error signal is infinitesimal.

In contrast with it, when the tracking servo is off, the level of the tracking error signal becomes high because the light beam traverses a track on the recording medium. Thus, the tracking error signal component that might mix with the focusing error signal becomes large. Particularly, in the case of a seeking operation of the light head, because the light beam traverses tracks at a high speed, the frequencies of the tracking error signal component in the focusing error signal are in a wide range of from some Hz to some hundred kHz, covering frequencies much higher than the sampling frequency of the focusing control. Therefore, in the seek operation of the optical head, the tracking error signal component disturbs the focusing servo operation because of the influence of aliasing, thus disturbing the focusing control or in the worst case, causing defocusing.

In order to overcome such a problem, a steep aliasing filter can be used having a cut-off frequency being a half of the sampling frequency, as the filter 4 in the focusing servo loop. Using such a steep filter, however, increases the circuitry scale of filter, which raises the cost and which does not allow a sufficiently wide band of focusing servo operations to be performed because of a large phase shift. On the other hand, in order to secure a wide band of a focusing servo operation without using a steep filter, the sampling frequency must be increased. An increase in the sampling frequency requires use of a CPU having a fast processing speed. However, a CPU having the fast processing speed is expensive and there is a limit on the processing speed of the CPU. Therefore, the above problem hindred an increase in the capacity and speed of access of optical disk and hindered achieving improved servo accuracy at a low cost with the increase of capacity and speed.

SUMMARY OF THE INVENTION

The present invention has been developed in view of the above circumstances, and an object of the invention is to provide an optical information recording and/or reproducing apparatus capable of performing a stable focusing servo operation during a seek operation of an optical head and capable of performing servo processing with a low-speed CPU.

The above object can be achieved by an optical information recording and/or reproducing apparatus for recording and/or reproducing information in or from a recording medium with a light beam, which comprises:

means for generating a focusing error signal of the light beam;

a filter for filtering the focusing error signal, the attention of the filter being greater at a high frequency region;

means for selecting either a focusing error signal subjected to filtering by the filter or a focusing error signal not subjected to filtering by the filter in accordance with an operating mode of the apparatus; and means for executing focusing control of the light beam, using the focusing error signal selected.

The details will be explained in the description of embodiments which follows.

DETAILED DESCRIPTION OF THE PREFERRED EMBODIMENTS

Figure 1:
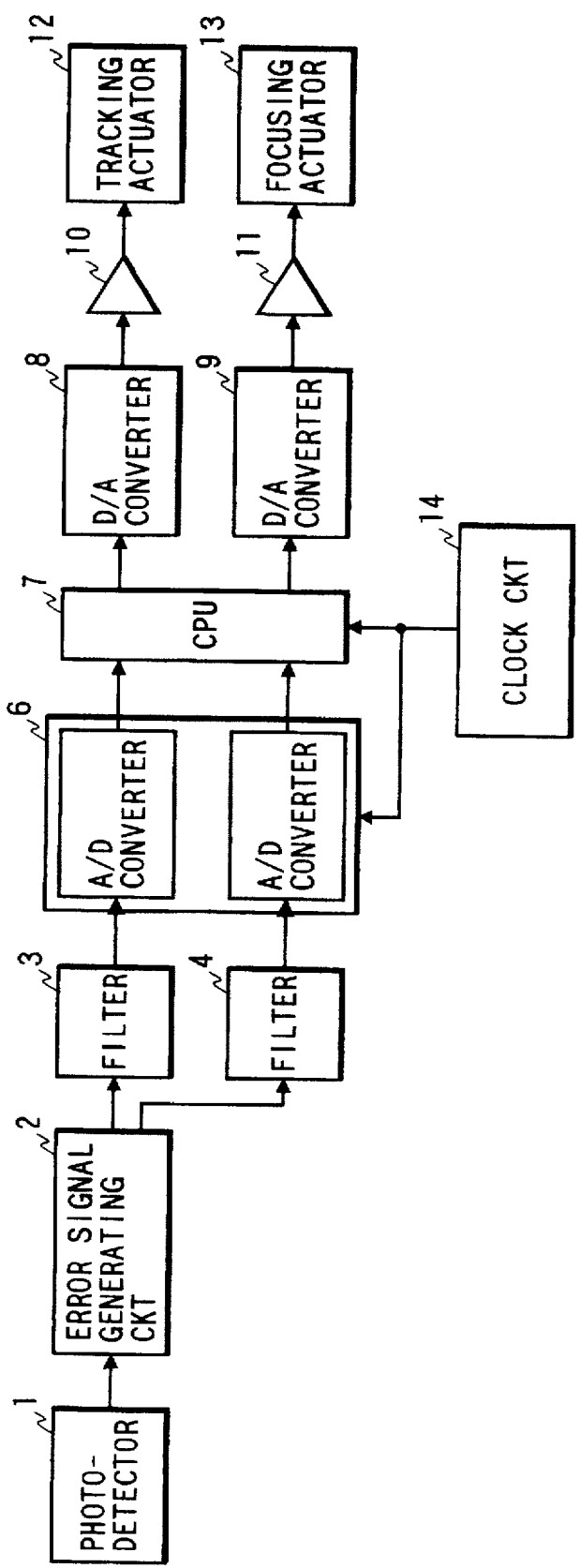
FIG. 1 is a block diagram to show a servo control apparatus in a conventional optical information recording and/or reproducing apparatus.
Figure 2:
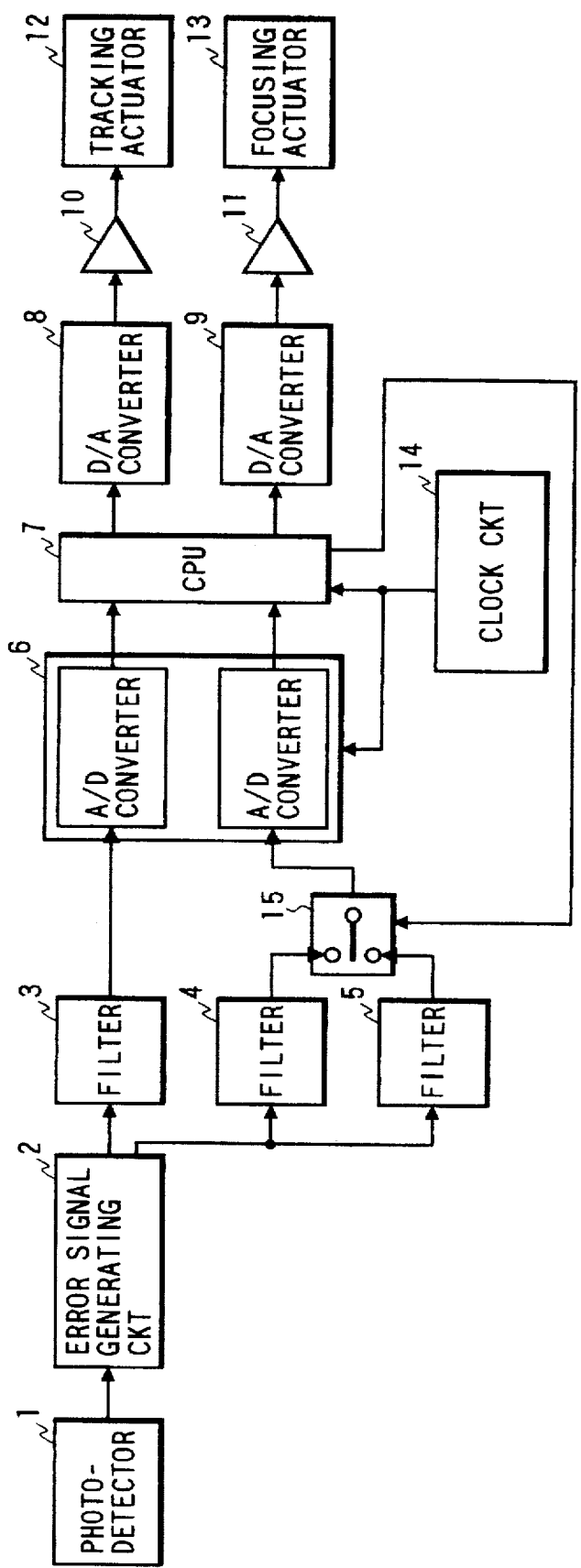
FIG. 2 is a block diagram to show an embodiment of the optical information recording and/or reproducing apparatus of the present invention.

Embodiments of the present invention will be explained in detail with reference to the drawings. FIG. 2 is a block diagram to show an embodiment of a servo control apparatus in an optical information recording and/or reproducing apparatus according to the present invention. In FIG. 2, the same portions or elements will be denoted by same reference numerals as those in the conventional apparatus of FIG. 1, and the description thereof will be omitted. In FIG. 2, filter 4 and filter 5 are filters with mutually different characteristics, and the focusing error signal generated in the error signal generating circuit 2 is input through the filters 4 and 5 into a switch 15. The switch 15 selects either one of output signals from the filter 4 and filter 5, and the selected output signal is input into one channel of the A/D converter 6. The switch 15 is arranged to be changed over in accordance with the operating mode of the apparatus under the control of CPU 7. When normal recording or reproduction of information is carried out or when the tracking servo is on, the output signal from the filter 4 is selected. On the other hand, when the recording or reproduction of information is not carried out or when the tracking servo is off, the switch 15 is arranged to select the output signal from the filter 5. Other parts of the configuration of FIG. 2 are the same as in FIG. 1.

Figure 3:
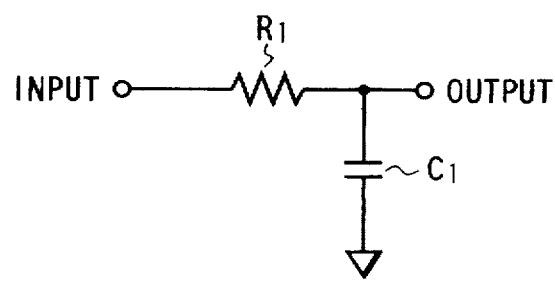
FIG. 3 is a circuit diagram to show a specific example of filter 4 in the embodiment of FIG. 2.
Figure 4:
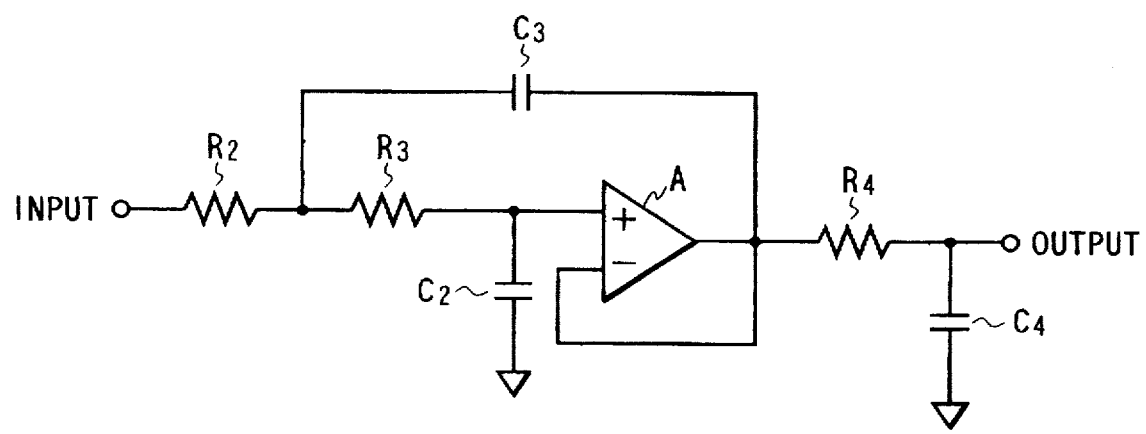
FIG. 4 is a circuit diagram to show a specific example of filter 5 in the embodiment of FIG. 2.

Here, the filter 4 is constructed of a primary low-pass filter composed of a resistor $R_1$ and a capacitor $C_1$ as shown in FIG. 3. Further, the filter 5 is a tertiary low-pass filter consisting of an operation amplifier A, an active filter composed of resistors $R_2$, $R_3$ and capacitors $C_2$, $C_3$, and a primary low-pass filter composed of a resistor $R_4$ and a capacitor $C_4$. Each of the filters 4, 5 has a cut-off frequency set to below a half of the sampling frequency. The filter 4 does not always have to be provided; for example, it can be omitted where noise is low.

Figure 5:
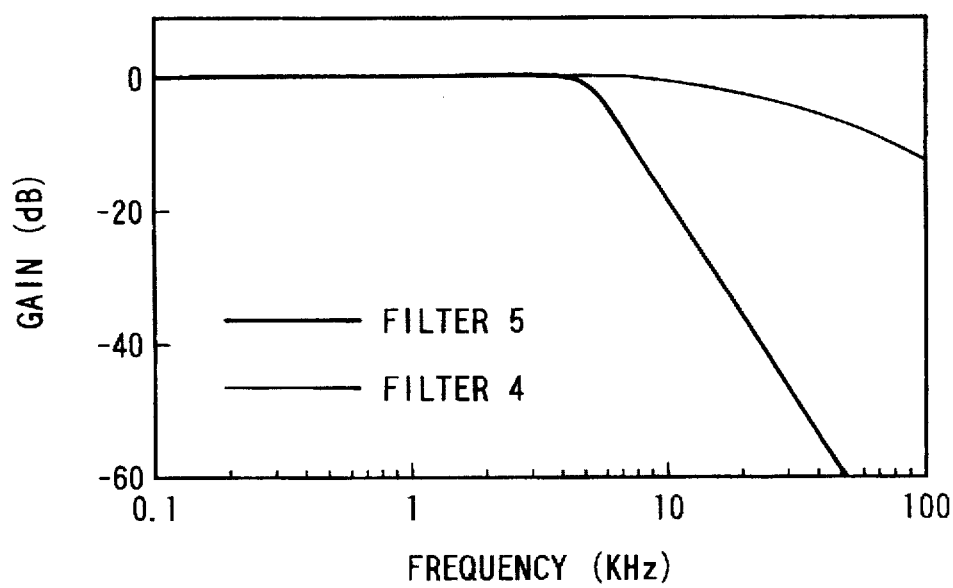
FIG. 5 is a drawing to show the frequency characteristics of the gains of filter 4 and filter 5.
Figure 6:
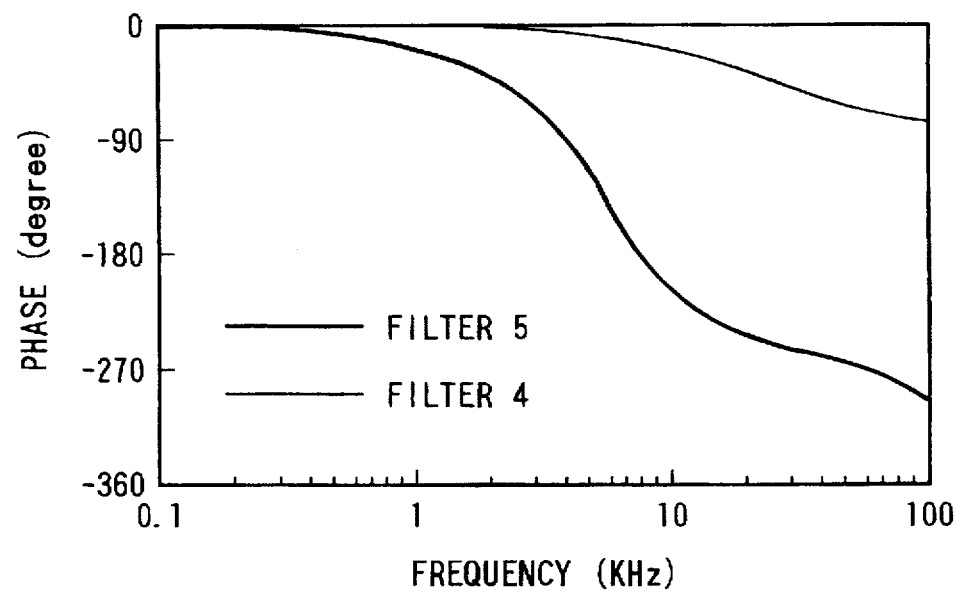
FIG. 6 is a drawing to show the frequency characteristics of phases of filter 4 and filter 5.

FIG. 5 is a drawing to show the frequency characteristics of the gains of the filters 4 and 5. As apparent from FIG. 5, the frequency characteristic of the filter 4 is gentle, whereas that of the filter 5 is steep. FIG. 6 shows the frequency characteristics of the phases of the filters 4 and 5. It is seen from FIG. 6 that the filter 4 has small phase delays while the filter 5 large phase delays. As described, the filter 4 has small phase delays and a gentle frequency characteristic, whereas the filter 5 has steep frequency characteristic and large phase delays.

The operation of the above embodiment is next explained in detail. First, when information is recorded or reproduced or when the tracking servo is on, even without performing recording or reproduction, the switch 15 is changed over to select the output signal from the filter 4 under the control of CPU 7, as described above. Accordingly, the focusing error signal passing through the filter 4 is input into one channel of the A/D converter 6 in this case. In this state the clock circuit 14 outputs the clock signal, for example, of 50 kHz to the A/D converter 6 and the CPU 7, and the CPU 7 executes servo processing at the frequency of this clock signal. The servo processing is carried out as explained with FIG. 1: the CPU 7 captures the digital values of the tracking error signal and the focusing error signal from the A/D converter 6 at the timing of the clock signal from the clock circuit 14 and the CPU 7 handles the phase compensation and gain arithmetic of tracking and focusing, based on those values. The arithmetic results of tracking and focusing each are output through the D/A converters 8, 9 to the associated drivers 10, 11. The servo processing is carried out at a constant frequency in this manner, and on the occasion of each processing, the tracking control and the focusing control are performed so as to let the light beam from the optical head follow an information track and so as to keep the light beam in focus by controlling the tracking actuator 12 and focusing actuator 13 in accordance with the arithmetic results.

Here, as described above, when information is recorded or reproduced or when the tracking servo is on, the switch 15 is connected to the filter 4, and thus, the phase compensation and gain arithmetic in the CPU 7 is performed in a wide servo band not affecting recording or reproduction, for example in the band of 3 kHz in the present embodiment. Accordingly, by selecting the filter 4 as described above, the focusing control can be performed with high accuracy upon normal recording or reproduction of information.

On the other hand, when recording or reproduction of information is not carried out or when the tracking servo is off, the switch 15 is changed over to select the output signal from the filter 5 under the control of CPU 7. When recording or reproduction is not carried out or when the tracking servo is off, the light beam from the optical head is in a state of traversing a track because of the eccentricity of the recording medium. Further, when the optical head is moved for access to a desired track, the seek control of the optical head is also carried out while keeping the tracking servo off. Accordingly, in such cases, the CPU 7 executes only the processing for the focusing servo operation at the frequency of the clock signal. Here, the CPU 7 captures the focusing error signal from the filter 5 for every input of the clock signal from the clock circuit 14 and executes the servo processing of focusing based on a value of the focusing error signal.

In this case, as described previously, the tracking error signal component mixed in the focusing error signal becomes large when the tracking servo is off. Particularly, during a seek operation of the optical head, frequency components of the tracking error signal are high. Since the filter 5 has a steep frequency characteristic as shown in FIG. 5, the filter 5 eliminates the high frequency components of tracking error signal mixed in the focusing error signal even during a seek operation of the optical head. Accordingly, when the tracking servo is off, and particularly during a seek operation of the optical head, the focusing servo can be stabilized without disturbance of focusing servo operation or without causing defocusing. Further, the filter 5 has a large phase shift, and thus, the band of the focusing servo becomes narrower, for example 1.5 kHz, than that upon recording or reproduction. In such a case, the gain of the phase compensation filter in the CPU 7 is lowered according to the phase delay and the phase is advanced.

Figure 7:
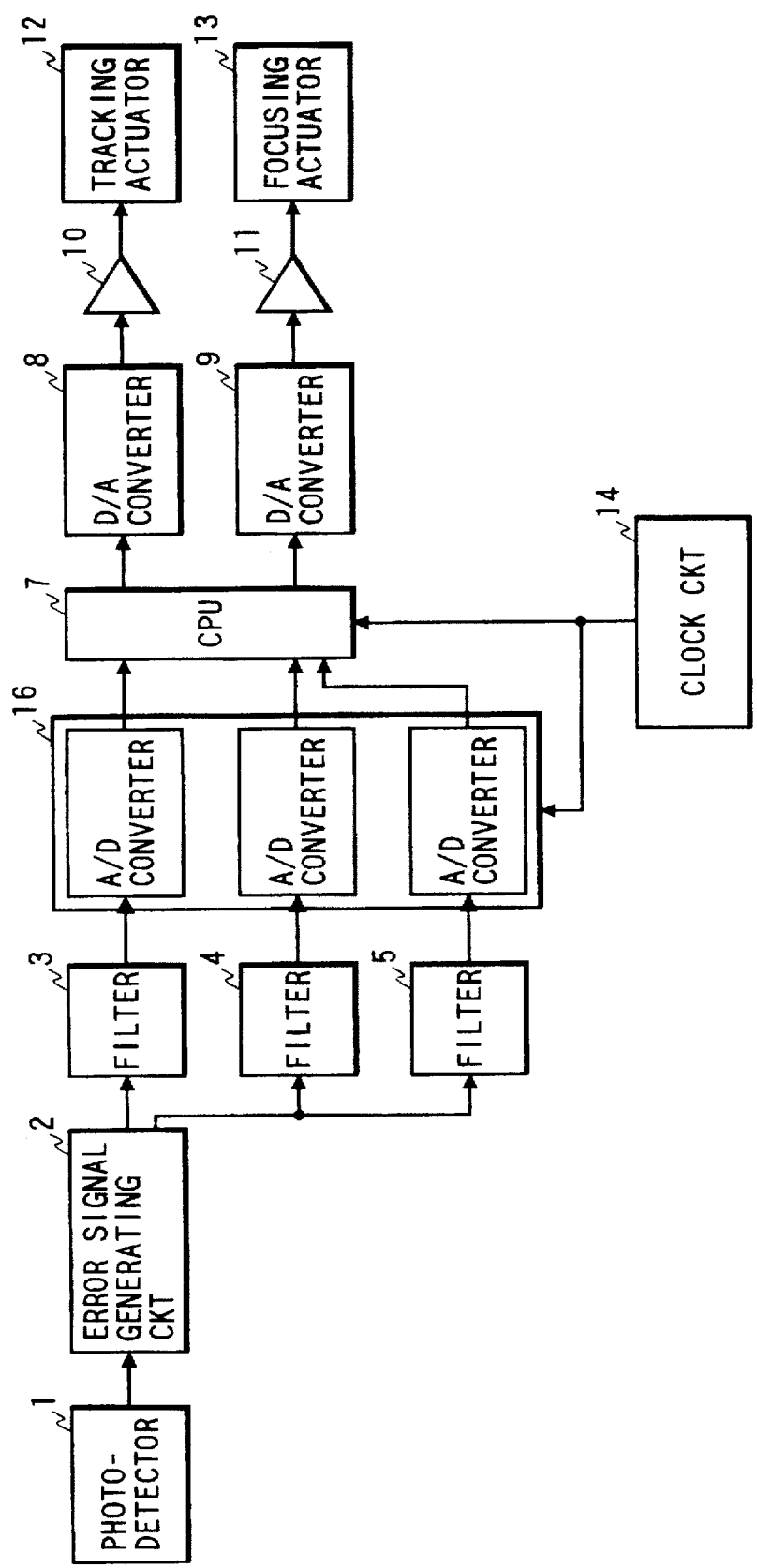
FIG. 7 is a block diagram to show another embodiment of the present invention.

FIG. 7 is a block diagram to show another embodiment of the present invention. This embodiment is so arranged that the outputs from the filters 4, 5 are input into two channels in a 3-channel A/D converter 16, and the CPU 7 selects one of the two channels in the A/D converter according to the operating mode of the apparatus. Namely, the CPU 7 selects one A/D converter channel associated with the filter 4 when the recording or reproduction is carried out or when the tracking servo is on. When recording or reproduction is not carried out or when the tracking servo is off, the CPU 7 selects the other A/D converter channel associated with the filter 5. Accordingly, the present embodiment can also stabilize the focusing servo, preventing disturbance of the focusing servo operation during the seek operation of the optical head in the same manner as in the embodiment of FIG. 2. Since the present embodiment excludes the switch 15 of FIG. 2, the packaging area can be decreased by that extent.

As detailed above, the present invention involves selecting one of focusing error signals according to the operating mode, whereby focusing control can be carried out with high accuracy by keeping a wide band upon recording or reproduction of information and whereby the stable focusing control can be performed preventing disturbance of the focusing servo operation and defocusing even when the tracking servo is off, particularly during the seek operation of the optical head. Further, the sampling frequency of the focusing error signal does not have to be increased in the present invention, and thus, the servo processing can be executed by a cheap CPU of a low speed.

What is claimed is:

1. An optical information recording and/or reproducing apparatus for recording and/or reproducing information on or from a recording medium with a light beam, comprising:

means for generating a focusing error signal of the light beam;

a filter for performing filtering of the focusing error signal, wherein the gain attenuation factor of said filter is greater at a high frequency region than in a low frequency region;

selecting means for selecting either a focusing error signal subjected to filtering by said filter or a focusing error signal not subjected to filtering by said filter in accordance with an operating mode of the apparatus; and means for executing focusing control of said light beam on the basis of the selected focusing error signal, wherein said filter is a first filter, said apparatus further comprising a second filter for filtering the focusing error signal, an attenuation factor of said second filter being smaller at the high frequency region than that of said first filter, wherein said selecting means selects either a focusing error signal subjected to filtering by the first filter or a focusing error signal subjected to filtering by the second filter.

2. The apparatus according to claim 1, wherein said selecting means selects the focusing error signal filtered by said second filter upon normal recording and/or reproduction of information, and said selecting means selects the focusing error signal filtered by said first filter in a seek operation.

3. The apparatus according to claim 1, further comprising means for generating a tracking error signal of said light beam, and means for executing tracking control of said light beam, using said tracking error signal, wherein said selecting means selects the focusing error signal filtered by said second filter upon normal recording and/or reproduction of information and said selecting means selects the focusing error signal filtered by said first filter when said tracking control is off.

* * * * *